(12) United States Patent
Spiegel et al.

(10) Patent No.: US 6,242,702 B1
(45) Date of Patent: Jun. 5, 2001

(54) CIRCUIT BREAKER UNIT

(75) Inventors: Jacob Birk Spiegel, Jesup; Chad Raymond Mittelstadt; Gregory A. Cirves, both of Cedar Rapids, all of IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/429,068

(22) Filed: Oct. 29, 1999

(51) Int. Cl.[7] .................................................. H01H 9/20
(52) U.S. Cl. ..................................... 200/296; 200/50.21
(58) Field of Search ........................... 200/50.01, 50.21, 200/50.23–50.27, 293–296; 361/600, 605–611, 615

(56) References Cited

U.S. PATENT DOCUMENTS

| | | | |
|---|---|---|---|
| 3,663,773 | * 5/1972 | Powell | 200/50 AA |
| 3,806,768 | * 4/1974 | Gryctko et al. | 317/120 |
| 4,205,207 | * 5/1980 | Clausing | 200/50 AA |
| 4,447,858 | * 5/1984 | Farag et al. | 361/429 |
| 5,424,910 | * 6/1995 | Lees | 361/615 |

* cited by examiner

*Primary Examiner*—Michael Friedhofer
(74) *Attorney, Agent, or Firm*—Kareem M. Irfan; Larry I. Golden

(57) ABSTRACT

A circuit breaker unit having a backmold which can withstand horizontal axial forces, which cause deflection or bowing of the backmold. The circuit breaker unit comprises an enclosure, cradle and pultruded backmold. The pultruded backmold is molded with at least one horizontal rib adjacent a top end, a bottom end or an area therebetween to provide additional strength and support of the circuit breaker and field serviceable connections.

12 Claims, 4 Drawing Sheets

CIRCUIT BREAKER UNIT

BACKGROUND OF THE INVENTION

1. Field of the Invention

This invention relates generally to circuit breaker units and more particularly to circuit breaker units for large capacity circuit breakers, such as draw-out type circuit breakers.

2. Description of the Related Art

Circuit breaker units comprise, in part, circuit breaker backmolds which are commonly used as mounting surfaces for turnable joint mounts, current transformers and metering transformers.

The turnable joint mounts connect with the field serviceable connections to which the circuit breaker protects against short circuit and overload situations. The backmold is the main interface between the circuit breaker and the field serviceable connections. Therefore, the circuit breaker backmold must be reliable, safe and cost effective.

On large capacity circuit breakers, such as a draw-out type circuit breaker, extreme forces are placed along the horizontal axis of the backmold when engaging and disengaging (also known as "racking") the circuit breaker and when connections are made between the turnable joint mounts and field service connections, which can weigh in excess of 200 lbs. Force is also exerted on the backmold when the circuit breaker, often rated up to 6,000 amps, is tripped. Alone or in combination, these forces can cause deflection or bowing in a conventional backmold, which is made from thermoset materials, such as Bakelite®, a phenolic resin, that are heated in compression or injection molds.

Electrical clearance parameters and the dimensions of the circuit breaker enclosure limit the ability to add a bracing element to the backmold in order to provide greater strength and resist deflection and bowing. Therefore, in order to produce a backmold with sufficient strength, the compression or injection molds used to produce the conventional backmold must be of a suitable depth. Typical Bakelite® backmolds have a thickness of 4–5 inches and therefore, it is not feasible to add a brace to the backmold because of the limited space within the circuit breaker unit.

Other disadvantages with the use of conventional backmolds include the difficulty experienced when making modifications to the backmold. Conventional backmolds produced by compression or injection molding processes require changes in the mold when modifications are to be made to the backmold. Changes in the design of the mold are extremely costly because of the complexity of the mold. In contrast, less complex molds are used in manufacturing pultrudled backmolds and a majority of the features on the pultruded backmold can be post-machined. Therefore, when changes need to be made to a pultruded backmold, changes are made in the machining process and not necessarily the mold itself.

SUMMARY OF THE INVENTION

The present invention comprises a circuit breaker unit having a backmold that can withstand horizontal axial forces, which can cause deflection or bowing of the backmold. The circuit breaker unit of the present invention comprises an enclosure, a cradle for mounting and dismounting the circuit breaker from the field serviceable connections and a pultruded backmold attached to the cradle for providing support to the turnable joint mounts, which engaged both circuit breaker clusters and the field serviceable connections. The pultruded backmold is molded with at least one horizontal rib adjacent a top end, a bottom end or in an area between the top and bottom ends. The horizontal rib provides additional strength to the pultruded backmold.

The pultruded backmold of the present invention comprises a composite material, preferably a plurality of fiberglass fiber encased in a polyester resin which is pulled through a heated die. By utilizing a pultrusion process, the fibers in the composite material are oriented in such a manner as to provide a high strength backmold. Additionally, the pultruded backmold has a thickness of only 1½–1¾ inches compared to the 4–5 inch thick conventional backmold. The molds used in producing the pultruded backmold do not need to be as deep or complex as the compression or injection molds used to produce a conventional backmold. Therefore, single piece pultruded backmolds can be manufactured with less support and structural geometry, which reduces the likelihood of failure due to hidden flaws and manufacturing costs.

Examples of the more important features of the invention thus have been summarized rather broadly in order that the detailed description thereof that follows may better be understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1:
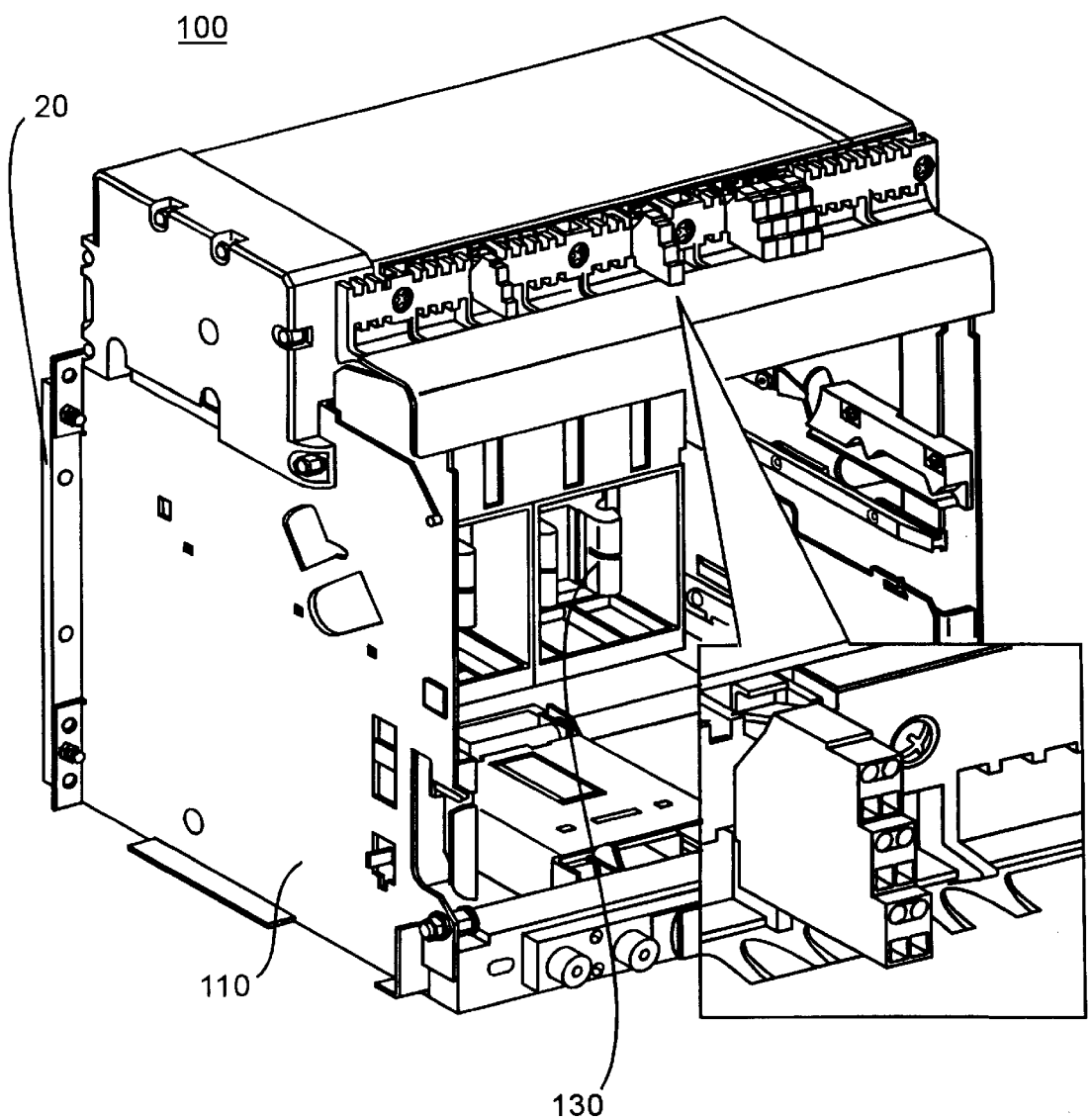
FIG. 1 is an isometric view of a conventional circuit breaker unit, comprising a cradle, turnable joint mounts and backmold.

Circuit breakers are used to protect electrical equipment from overload and short circuit situations. Circuit breakers utilized with large electrical equipment, such as draw-out type circuit breakers, are contained as a unit. FIG. 1 is an isometric view of a conventional circuit breaker unit 100 (prior art). The circuit breaker unit 100 comprises an enclosure (not shown) which houses the circuit breaker, circuit breaker cradle 110, backmold 120 and turnable joint mounts 130. The circuit breaker cradle 110 allows for easy mounting and dismounting of the circuit breaker from the filed serviceable connections. A backmold 120 attaches to the circuit breaker cradle 110 and provides a mounting surface for turnable joint mounts 130, which engage the circuit breaker clusters, field serviceable connections and current and metering transformers. The weight of the customer connections and transformers, easily exceeding 200 lbs., place a relatively large force on the backmold 120. Additionally, when an overload or short circuit occurs and the circuit breaker is tripped, additional force is placed on the backmold 120. Therefore, conventional backmolds are susceptible to deflection or bowing.

The backmold 120 must provide sufficient structural strengths while remaining non-conductive and resistive to carbon tracking, a degradation of the backmold surface material from the formation of conductive carbonized paths. Conventional backmolds are made from thermoset materials. To account for the applied forces, such backmolds are made relatively thick, typically 4–5 inches. Therefore, the conventional backmold is heavy, consumes a large amount of space within the circuit breaker enclosure, and is expensive to produce.

Figure 2:
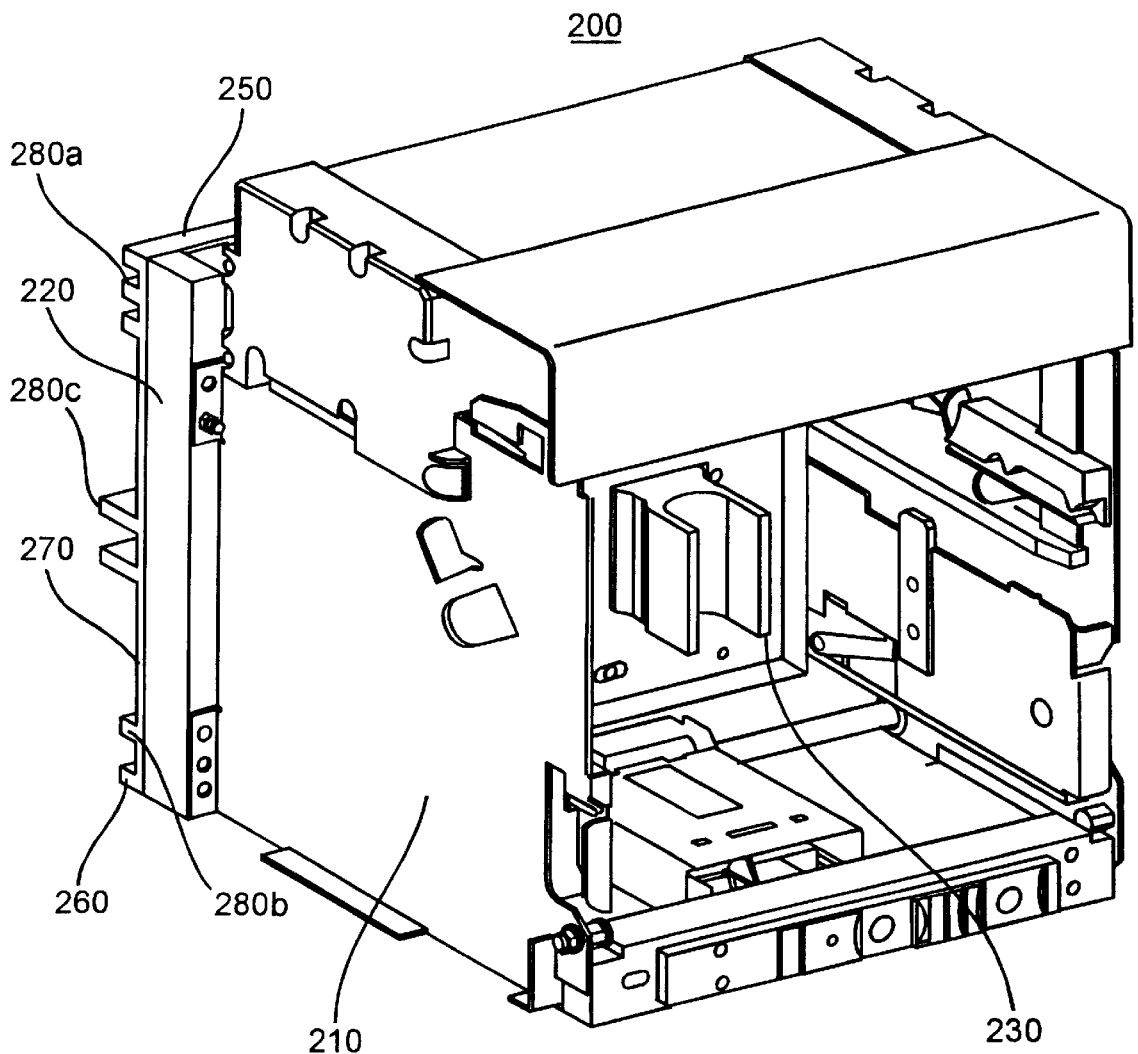
FIG. 2 is an isometric view of a circuit breaker unit according to the preferred embodiment wherein said circuit breaker unit comprises a cradle, turnable joint mounts and a pultruded backmold.
Figure 3:
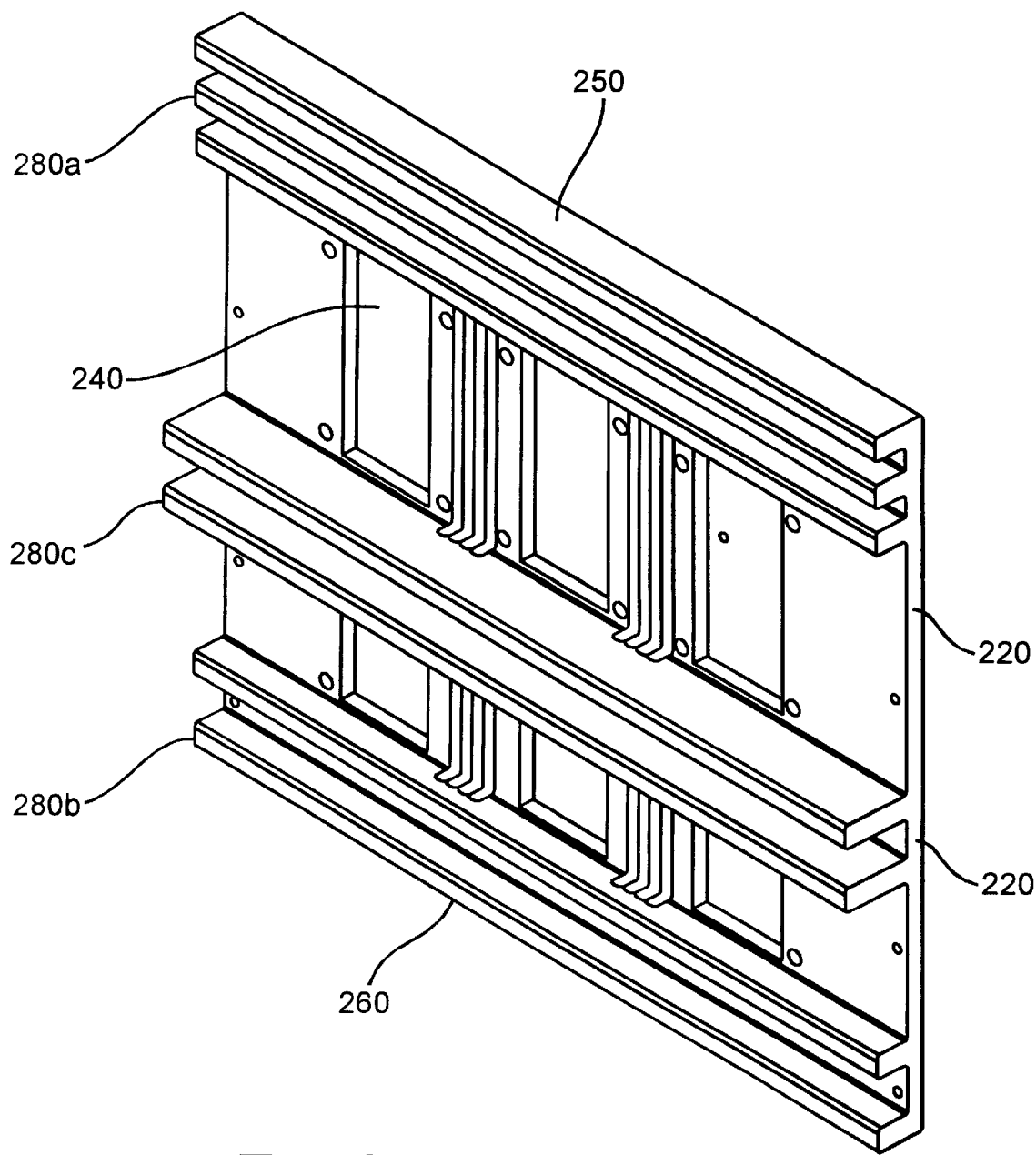
FIG. 3 is an isometric view of a pultruded backmold for use in a circuit breaker unit according to the preferred embodiment.
Figure 4:
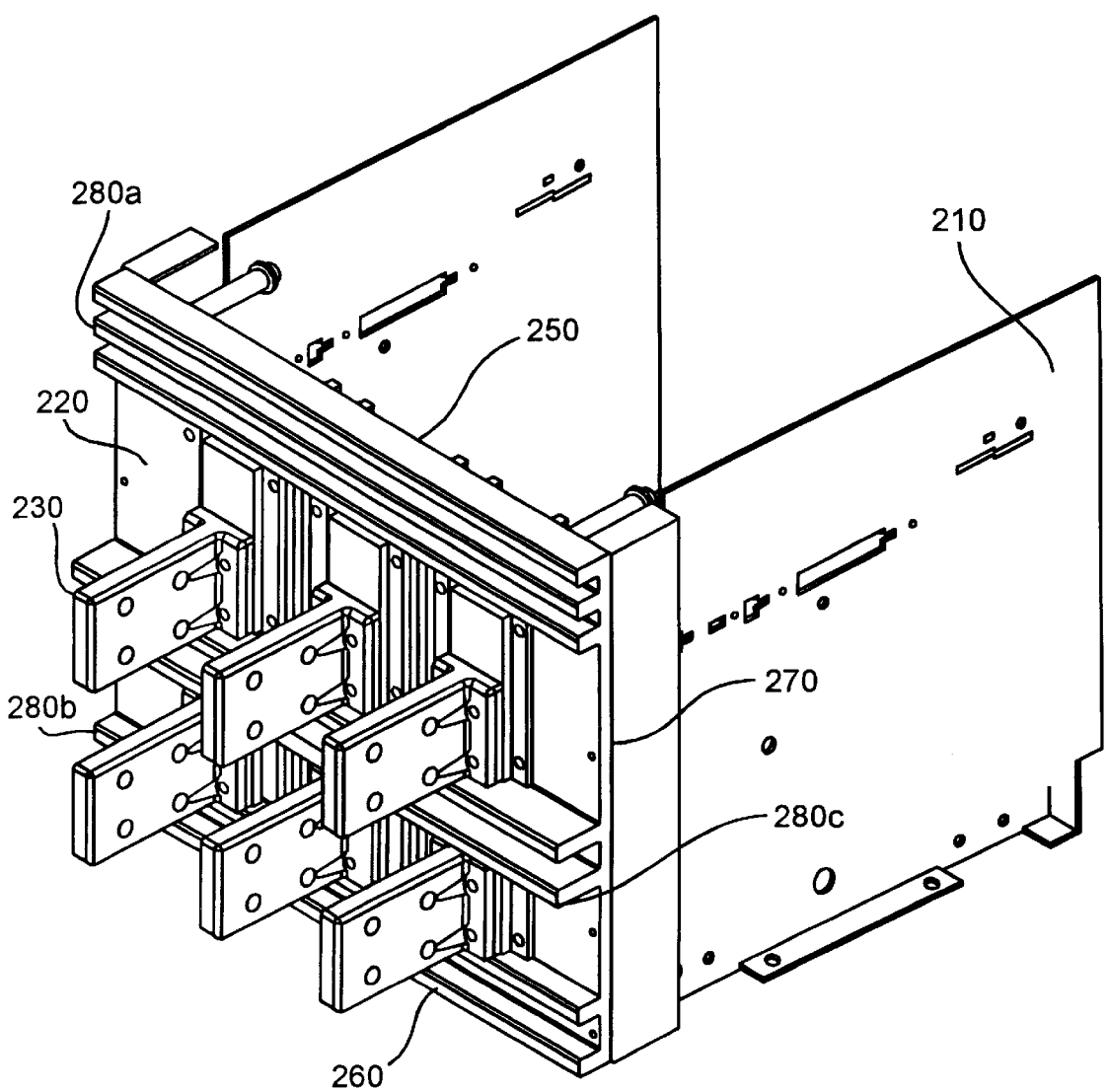
FIG. 4 is an isometric view of the pultruded backmold attached to a circuit breaker cradle according to the preferred embodiment.

FIGS. 2–4 illustrate a circuit breaker unit 200 according to one embodiment of the present invention. Referring to FIG. 2, the circuit breaker unit 200 includes an enclosure (not shown), a cradle 210 which facilitates removal of the circuit breaker from the field serviceable connections and a pultruded backlmold 220 having a plurality of turnable joint mounts 230 mounted thereon. FIG. 3 illustrates the pultruded backmold 220 with a plurality of openings 240 through which the turnable joint mounts 230 are inserted.

The pultruded backmold 220 comprises a top end 250, bottom end 260 and an area 270 therebetween. The pultruded backmold 220 is rigidly attached to the cradle 210 and has at least one protrusion or rib 280 provided along a horizontal axis of the pultruded backmold 220 to provide added strength and support. The protrusion or rib 280 can be placed adjacent the top end 250, bottom end 260 or an area 270 therebetween.

In FIGS. 2–4, pultruded backmold 220 is shown to include ribs 280*a* adjacent a top end 250, ribs 280*b* adjacent the bottom end 260 and ribs 280*c* in an area 270 between the top end 250 and bottom end 260. The number of ribs 280 may vary depending upon the desired rigidity. The depth of the ribs 280 may also vary depending upon their location on the pultruded backmold 220. Ribs 280*c* are preferably deeper because greater force is applied to area 270. At least one rib 280 at the top end 250, bottom end 260 and in an area 270 between is preferred.

The pultruded backmold 220 of the present invention is preferably made from a composite material, preferably a plurality of fiberglass fiber encased in a polyester resin which is pulled through a heated die. By utilizing a pultrusion process, the fibers in the composite material are oriented in such a manner as to provide a high strength backmold.

The pultruded backmold 220 has a thickness of only 1½–1¾ inches versus the 4–5 inch thick conventional backmold 120. The molds used in producing the pultruded backmold 220 do not need to be as deep or complex as the compression or injection molds used to produce a conventional backmold 120. Therefore, single piece pultruded backmolds can be manufactured with less support and structural geometry, which reduces the likelihood of failure due to hidden flaws and manufacturing costs.

The foregoing description is directed to particular embodiments of the present invention for the purpose of illustration and explanation. It will be apparent, however, to one skilled in the art that many modifications and changes to the embodiment set forth above are possible without departing from the spirit of the invention.

What is claimed is:

1. A circuit breaker unit for interruption of a circuit when a short or overload situation occurs within a field serviceable connection, comprising:

(a) an enclosure;

(b) a cradle positioned within said enclosure;

(c) a circuit breaker secured in said cradle positioned in said enclosure; and (d) a pultruded backmold attached to said cradle, said backmold having at least one horizontal rib for providing support for said circuit breaker and the field serviceable connection.

2. The circuit breaker unit of claim 1, wherein said at least one horizontal rib is adjacent a top end of said pultruded backmold.

3. The circuit breaker unit of claim 1, wherein said at least one horizontal rib is adjacent a bottom end of said pultruded backmold.

4. The circuit breaker unit of claim 1, wherein said at least one horizontal rib is between a top and bottom end of said pultruded backmold.

5. The circuit breaker unit of claim 1, wherein said pultruded backmold comprises a composite material.

6. The circuit breaker unit of claim 5, wherein said composite material comprises a plurality of fiberglass fiber.

7. The circuit breaker unit of claim 5, wherein said composite material comprises a polyester resin.

8. The circuit breaker unit of claim 5, wherein said composite material comprises a plurality of fiberglass fiber and polyester resin.

9. The circuit breaker of claim 1, wherein said at least one horizontal rib comprises a plurality of horizontal ribs.

10. The circuit breaker unit of claim 9, wherein said plurality of horizontal ribs are adjacent a top end of said pultruded backmold.

11. The circuit breaker unit of claim 9, wherein said plurality of horizontal ribs are adjacent a bottom end of said pultruded backmold.

12. The circuit breaker unit of claim 9, wherein said plurality of horizontal ribs are between a top and bottom end of said pultruded backmold.

\* \* \* \* \*